United States Patent [19]

Comfort

[11] Patent Number: 5,369,690
[45] Date of Patent: Nov. 29, 1994

[54] TELEPHONE CALL DETECTING CIRCUIT AND A METHOD OF REMOTELY ACCESSING AND TESTING A TELEPHONE

[75] Inventor: John J. Comfort, Basingstoke Hampshire, United Kingdom

[73] Assignee: Mars Incorporated, McLean, Va.

[21] Appl. No.: 927,274

[22] PCT Filed: Mar. 15, 1991

[86] PCT No.: PCT/GB91/00409

§ 371 Date: Sep. 11, 1992

§ 102(e) Date: Sep. 11, 1992

[87] PCT Pub. No.: WO91/14330

PCT Pub. Date: Sep. 19, 1991

[30] Foreign Application Priority Data

Mar. 15, 1990 [GB] United Kingdom ............... 9005874.4

[51] Int. Cl.5 ............................................. H04M 15/00
[52] U.S. Cl. .................................. 379/106; 379/107; 379/372; 379/375; 379/29; 379/32
[58] Field of Search ................. 379/375, 372, 373, 27, 379/28, 29, 32, 33, 155, 143, 106, 107

[56] References Cited

U.S. PATENT DOCUMENTS

| | | |
|---|---|---|
| 3,496,300 | 2/1970 | Stokes . |
| 4,039,768 | 8/1977 | O'Maley . |
| 4,126,762 | 11/1978 | Martin et al. .................. 379/106 |
| 4,355,205 | 10/1982 | Walker ............................ 379/106 |
| 4,567,325 | 1/1986 | Crouch et al. . |
| 4,644,109 | 2/1987 | Takeda et al. . |
| 4,819,261 | 4/1989 | Takeda et al. . |
| 4,827,501 | 5/1989 | Hansen . |
| 4,845,741 | 7/1989 | Fourdraine . |
| 4,995,109 | 2/1991 | Arizumi et al. ................ 379/106 X |

FOREIGN PATENT DOCUMENTS

| | | |
|---|---|---|
| 1425894 | 2/1976 | United Kingdom . |
| 2116807 | 9/1983 | United Kingdom . |
| 2118000 | 10/1983 | United Kingdom . |
| 2149616 | 6/1985 | United Kingdom . |
| 2176639 | 12/1986 | United Kingdom . |
| 2176970 | 1/1987 | United Kingdom . |
| 2183966 | 6/1987 | United Kingdom . |
| 1594931 | 8/1987 | United Kingdom . |

Primary Examiner—James L. Dwyer
Assistant Examiner—Paul A. Fournier
Attorney, Agent, or Firm—Davis Hoxie Faithfull & Hapgood

[57] ABSTRACT

A telephone circuit is provided for distinguishing between a normal incoming telephone call and a test telephone call. When the telephone is polled from a central station to cause it to undergo a self-test routine, a ringing signal is used which consists of a series of three ringing signals each lasting less than a predetermined time. Consequently, when such a ringing signal is received, a relay remains open so that there is no audible ringing tone. The system thus enables a testing routine to be carried out by the telephone without causing the telephone to ring.

21 Claims, 2 Drawing Sheets

TELEPHONE CALL DETECTING CIRCUIT AND A METHOD OF REMOTELY ACCESSING AND TESTING A TELEPHONE

1. Field of the Invention

The present invention relates generally to telephone signalling and in particular relates to a method and apparatus for enabling a telephone to be accessed from a remote location.

2. Background of the Invention

When operating a public payphone system, one of the most important aspects is to keep the payphones available for use and in good repair. If a payphone becomes faulty or is broken through misuse or vandalism it immediately ceases to be able to generate revenue, and, perhaps more importantly, the lack of availability reflects badly on the operator. In some cases this bad publicity and service affects the operator's overall business, particularly where the level of payphone service is an intrinsic part of the public telephone operating licence.

The concept of a built-in self-test as a fault detection method, coupled with an in-built dial-up modem to report the fault to a management or service center, is well known. Such facilities are also used to send a routine status message to the management or service center at a predetermined time (usually during the early hours of the morning, or any other time when the likelihood of use of the phone is very low). This status message can provide a message indicating correct functioning of the telephone.

However, these methods will only work at a predetermined time, or reactively, and cannot give a totally up-to-date picture to the management office of the operational status of the payphones. Obviously each payphone could be programmed to run a self-test and report at frequent intervals, say once every hour, that it is correctly functioning, but this restricts the availability of the payphone to the consumer, and could seriously overload the telephone network capacity with an unnecessary high level of traffic from e.g. several thousand payphones providing very little new information.

An example of such a telephone signalling system is described in the present applicant's patent application GB-A-2,176,639. In this system all incoming calls within a predetermined time window are automatically answered before the telephone receiver has time to ring.

Another example of such a telephone signalling system is described in U.S. Pat. No. 4,845,741 (Fourdraine). In this system the remote telephone can be accessed only during a predetermined time window, such as between three a.m. and three-ten a.m. In this time interval all incoming telephone calls are deemed to be automated calls from a central location, and the telephone is caused to go off-hook. This is done in such a manner as to prevent ringing signals on the telephone line from ringing any of the telephones connected to the telephone line within the period before ring-trip occurs at the exchange. Outside this time interval the telephone responds only to normal incoming calls.

One major benefit of such a "polled" approach is that a payphone that has been reported as faulty can be checked remotely before incurring the cost of despatching a service technician. Clearly a payphone that does not respond to an interrogation would be considered faulty.

U.S. Pat. No. 4,827,501 discloses a telephone call screening apparatus which, on detecting a ringing signal, immediately answers the call. The apparatus generates its own local "psuedo-ringing" signal, but this is prevented from causing audible ringing for a delay period of 2.5 seconds. During this period the apparatus determines whether a special dial signal indicative of a sales call has been transmitted. If so, an acknowledgement is transmitted and the apparatus hangs up. Otherwise audible ringing occurs and a user can answer the call. This arrangement has the disadvantage that all calls have to be immediately answered by the apparatus, and correct operation requires transmission of special dial signals.

It would be desirable to provide a method of instructing a particular payphone to carry out a self-test and report back, at any time of day or night, preferably without causing ringing of the telephone.

SUMMARY OF THE INVENTION

According to a first aspect of the present invention there is provided a telephone call detecting circuit having means arranged to distinguish between a normal incoming telephone call and a test incoming telephone call on the basis of a characteristic of the ringing signal received.

In a system incorporating such a circuit, there is no need to restrict test calls to a predetermined time or time interval.

The characteristic of the ringing signal which is used to distinguish between normal and test calls may be the duration of the ringing signal and/or the rate of successive occurrences of the ringing signal.

According to a second aspect of the present invention there is provided a telephone call detecting circuit having means arranged to respond to a call by muting the ringing sound for a predetermined time following receipt of the ringing signal and thereafter to enable said ringing sound so that a user can perceive the receipt of a call and answer the telephone. Preferably, means are provided for automatically answering the call within the predetermined time, and then performing a predetermined routine, in response to detecting a predetermined characteristic of the ringing signal.

The provision of means arranged to mute the ringing sound for a predetermined time following receipt of the ringing signal enables the telephone to be accessed totally transparently to customers by using a ringing signal having a duration no greater than the predetermined time.

According to a third aspect of the present invention there is provided a method of remotely accessing a telephone comprising transmitting to said telephone from a remote location an enable signal constituted by a ringing signal to cause said telephone to respond in a predetermined manner, wherein said telephone is adapted to distinguish between a normal incoming telephone call and a test incoming telephone call on the basis of a characteristic of said ringing signal.

According to a fourth aspect of the present invention there is provided a method of remotely accessing a telephone comprising transmitting to said telephone from a remote location an enable signal constituted by a ringing signal to cause said telephone to respond in a predetermined manner, wherein said telephone is adapted to respond to a call by muting the ringing sound for a predetermined time following receipt of said ringing signal and thereafter to enable said ringing sound so that a user can perceive the receipt of a call and answer the telephone.

BRIEF DESCRIPTION OF THE DRAWINGS

In order that the invention may be more fully understood, a non-limiting embodiment thereof will now be described with reference to the accompanying drawings, wherein.

DETAILED DESCRIPTION

Figure 1:
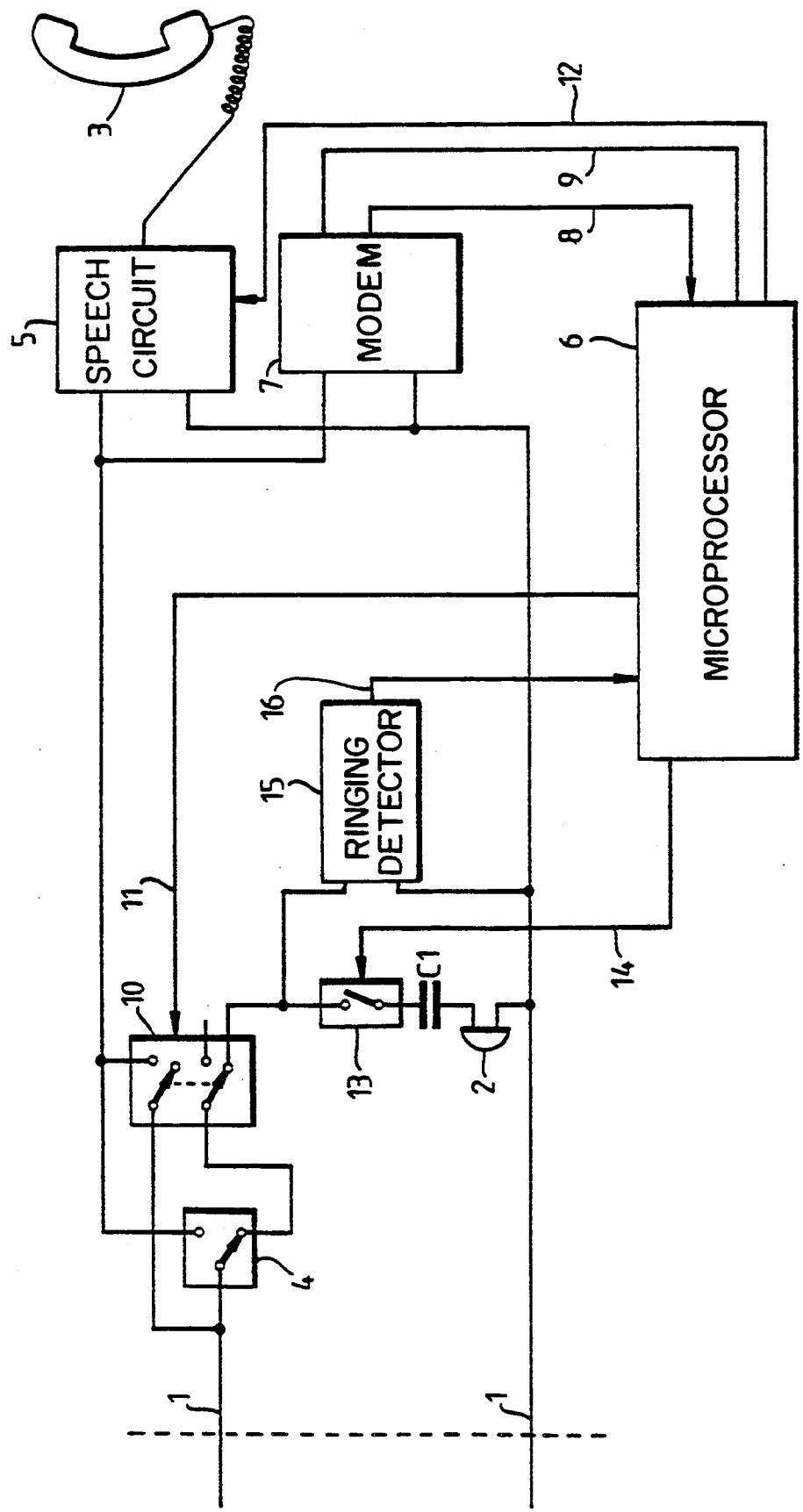
FIG. 1 is a block diagram of circuitry for use in a telephone in accordance with the present invention.

With reference to FIG. 1, a payphone comprises a telephone line pair 1 across which is applied an AC signal of greater than 50 V rms which is supplied via a capacitor C1 to a bell or similar sounding device 2 to attract attention to an incoming call. When a handset 3 is taken "off-hook", a hook switch 4 disconnects the device 2 and couples the line to speech circuits 5 connected to the handset so that the call can be made.

It is known to provide in a payphone a microprocessor 6 and a modem 7 interconnected via a serial data line 8 and a modem on/off control line 9. The modem 7 can be coupled to the telephone line pair 1 in parallel with the speech circuits 5. It is also known to provide a relay 10 controlled by a signal from the microprocessor 6 on line 11. The relay 10 performs a similar function to the hook switch 4, i.e. it selectively disconnects the telephone line pair 1 from the device 2 and connects it to the speech circuits 5 and modem 7. In known arrangements, the microprocessor 6 is able to use the relay 10 to connect the modem 7 to the telephone line pair at a predetermined time, disable the speech circuit 5 by generating a signal on a control line 12, and control the modem 7 to dial-up a central station and transmit a status message.

In the present embodiment there is provided a relay or switch 13 connected between the bell and one of the telephone lines. This relay 13 is controlled by a signal from the microprocessor 6 on a line 14. Such an arrangement therefore provides a means of selectively muting the bell by breaking the circuit formed between the telephone line pair and the bell. This arrangement is known per se in payphones for preventing use of the telephone for incoming calls.

There is further provided a ringing detector 15 arranged to sense a ringing signal on the telephone line pair 1, and to supply a signal indicative thereof to the microprocessor 6 on a line 16. The ringing detector 15 may be of a per se known construction and provides a continuous "ringing detect" output signal throughout the period when ringing voltages are intermittently applied to the telephone line pair 1. Although the components described above are individually known, as explained below, they are operated in a novel manner to achieve the advantages of the present invention.

In operation, when the telephone number of the particular telephone is dialled, an AC ringing signal is applied across the telephone line pair 1. At this stage, the relay 13 is in the open position, and consequently the bell 2 is muted. The ringing signal is detected by the ringing detector 15 which supplies an output signal on line 16 to processor 6, causing it to "wake-up" from an idle state. In the case of a line-powered telephone, the processor may be battery-powered, or alternatively, the voltage of the ringing signal is itself used as a power source for the processor until the normal loop current (i.e. that flowing in the telephone line pair) becomes available when the telephone goes off-hook, i.e. when the call is answered. In the case of a normal telephone call, the processor 6 serves to control relay 13 so that it closes the contact after the "ringing detect" output signal from the ringing detector 15 has been present for 3 seconds. Thus, for a normal incoming call, the intermittent ringing of the bell is muted for a period of 3 seconds.

The purpose of this arrangement is so that the telephone may be accessed from a central control station for checking whether the telephone is functioning correctly. To do this, ringing signals are applied for a period shorter than 3 seconds, and the detection of such a brief period of ringing signals indicates to the processor 6 that it may be the central control station which is communicating with the telephone and not a third party. In this case the relay 13 remains open and the processor awaits further ringing signals, each lasting less than 3 seconds. Upon receipt of such ringing signals, the telephone is caused to respond in one of a number of ways:

(a) Immediately go "off-hook" to answer the call, expecting modem communications;

(b) Immediately go "off-hook" as in (a), carry out a self-test routine and send a status message to the central control station;

(c) Go "off-hook", carry out a self-test routine, and dial a predetermined number and send a status message; or (d) Go "off-hook", dial the telephone number of the central control station and enter a modem dialogue with the station to determine what action is required, and then carry it out.

From a security point of view, options (b), (c) and (d) are preferred, with (c) and (d) being especially preferred. Option (d) provides the maximum amount of freedom. At the end of the communication, the processor 6 is returned to a mode which is receptive to ringing signals (i.e. the telephone line is placed "on-hook").

Figure 2:
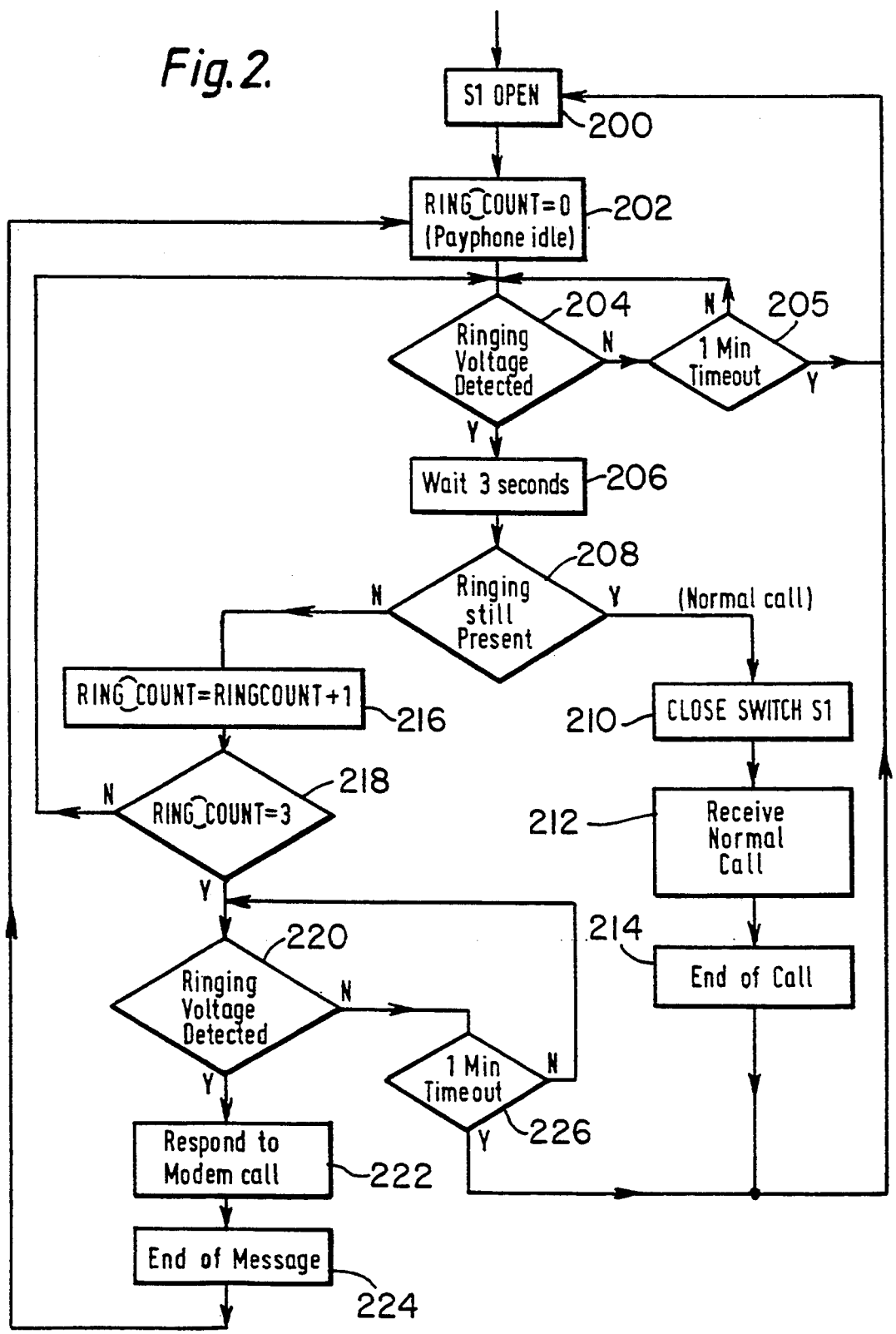
FIG. 2 is a flow diagram illustrating the operation of a telephone in accordance with the present invention.

A flowchart indicating the procedure adopted by the processor 6 is shown in FIG. 2.

The relay 13 is initially put in an open state (step 200) and a RINGCOUNT variable is set to zero (step 202). Step 204 is used to detect a ringing signal. If no signal is present step 205 checks a timeout counter, and assuming that a timeout count has not yet been reached, the program loops back to step 204. On detection of a ringing detect signal at step 204 there is a 3 second delay at step 206, and if, after this period, the ringing detect signal is still present (detected at step 208), this indicates that a normal telephone call is being received, and the relay 13 is caused to close at step 210, so that the bell can be heard and the telephone receiver lifted by a person receiving the call (step 212). After the end of the call (step 214) the relay 13 is again opened.

If, however, step 208 determines that the ringing detect signal is no longer present after the 3 second delay, the RINGCOUNT variable is incremented by one (step 216) and, assuming that step 218 determines that the value of the RINGCOUNT variable has not yet reached 3, the ringing detector awaits a further ringing signal (steps 204 and 205). When three ringing detect signals, each lasting less than 3 seconds, are detected within one minute, the RINGCOUNT variable will have the value 3, and detection of a further ringing voltage at step 220 within this one minute will automatically initiate one of the responses listed above at step 222. At the end of the response (step 224) the program loops back to step 202.

If no ringing signal is detected at step 220, the timeout counter is checked at step 226. If the timeout count has not been reached the program loops back to step 220. The timeout counter checked at steps 205 and 226 is caused to start counting upon reception of the first ringing voltage. If the timeout count reaches a value corresponding to one minute, the program loops back to step 202. This effectively inhibits the predetermined response unless the ringing signal has a characteristic such that 3 short ringing detect signals are detected, each of which lasts less than 3 seconds, and then a fourth ringing detect signal is detected, the overall time being no greater than one minute.

It can thus be seen that the processor serves to discriminate between ringing signals associated with normal incoming calls, wherein the ringing detect signal is present for in excess of 3 seconds, and a sequence of ringing signals associated with calls initiated by a central testing station having a coded ringing voltage producing 3 ringing detect signals each of less than 3 seconds' duration together with a fourth ringing signal, all occurring within one minute. Any ringing signal not falling within either of these two categories causes the relay 13 to remain open and the RINGCOUNT variable to be reset to zero.

Although in the above-described embodiment, coded signals each having a duration less than 3 seconds are used, of course any suitable time period could be employed, so long as this enables effective discrimination between incoming testing calls and incoming normal telephone calls. Equally, the period of one minute within which all of the 3 coded ringing detect signals are generated could be reduced or increased as desired, and fewer or more than 3 such signals could be employed.

It will be noted that this embodiment of the invention does not rely on modifying the intermittent pattern of ringing voltages generated by the telephone exchange; instead, it is merely the overall duration of a sequence of ringing voltages which determines the operation of the system.

Since the invention is concerned with the discrimination between incoming normal telephone calls and an incoming testing communication, a detailed description of the specific communication processes within such a testing communication is not included within this description.

Although the invention has been described in the context of payphones, it is clearly applicable to other kinds of telephones. Indeed, it is possible to apply the invention to a call detecting circuit separate from but connectable to a telephone. The circuit could form a unit for coupling to a standard connector of a telephone line, the unit having a standard connector for connection thereto of the telephone.

I claim:

1. A telephone call detecting circuit for use with a telephone having means arranged to generate in response to a ringing signal transmitted from a remote location a ringing sound, wherein the circuit includes means arranged to respond to a call by inhibiting the ringing sound for a predetermined time following receipt of the ringing signal and thereafter to enable said transmitted ringing signal to cause said ringing sound to be produced so that a user can perceive the receipt of a call and answer the telephone call and means for initiating a predetermined response in response to detecting the duration of each of a plurality of sequential ringing signals to be less than a predetermined value which is not greater than said predetermined time.

2. A circuit as claimed in claim 1, wherein the predetermined response includes the step of automatically answering the call before the end of the predetermined time.

3. A circuit as claimed in claim 1, wherein said predetermined response comprises a modem communication with a remote location.

4. A circuit as claimed in claim 1, wherein said predetermined response comprises a test routine and the transmission of a test result signal in response to said test routine.

5. A circuit as claimed in claim 4, adapted to transmit said test result signal via a telephone network.

6. A circuit as claimed in claim 1, wherein said response initiating means is enabled only after detecting that said plurality of sequential ringing signals has been produced during a period lasting no longer than a predetermined duration.

7. A circuit as claimed in claim 1, wherein said predetermined time is approximately 3 seconds.

8. A telephone call detecting circuit having means permitting access from a remote location in response to receipt of an enable signal and means for initiating a predetermined response only after receipt of said enable signal, wherein said enable signal comprises a plurality of sequential ringing signals, that said circuit further comprises means arranged to distinguish between a normal incoming telephone call and said enable signal on the basis of the duration of each of the ringing signals received, said enable signal comprising a plurality of sequential ringing signals the duration of each of which is less than a predetermined value and that said predetermined response comprises a modem communication with a remote location.

9. A telephone call detecting circuit as claimed in claim 1, coupled to a telephone.

10. A method of remotely accessing a telephone comprising transmitting to said telephone from a remote location an enable signal to cause said telephone to respond in a predetermined manner, wherein said enable signal comprises a plurality of sequential ringing signals, said telephone is adapted to distinguish between a normal incoming telephone call and a said enable signal on the basis of the duration of each of said ringing signals received, said enable signal comprising a plurality of sequential ringing signals the duration of each of which is less than a predetermined value the accessing of said telephone comprises testing the operation thereof; and the response comprises performing a test routine and transmitting a test result signal in response to the result of said test routine.

11. A method as claimed in claim 10, wherein the duration of each of said ringing signals of said enable signal is longer than that of a normal incoming telephone call, and wherein said telephone is adapted to mute the ringing sound, which would be otherwise produced in response to a transmitted ringing signal, for a predetermined time following receipt of said ringing signal and thereafter to enable said ringing sound so that a user can perceive the receipt of a normal incoming call initiated by transmission of a ringing signal having a duration exceeding the duration of each of said ringing signals of said enable signal and answer the telephone, said predetermined time being greater than or equal to said duration of each of said ringing signals of said enable signal.

12. A method as claimed in claim 11, wherein said predetermined time is approximately three seconds.

13. A method as claimed in claim 10, wherein the accessing of said telephone comprises testing the operation thereof by transmitting a test signal to said telephone to cause said telephone to perform a test routine and to transmit a test result signal in response to the result of said test routine.

14. A method as claimed in claim 10, wherein said test result signal is transmitted to said remote location.

15. A method as claimed in claim 13, wherein said test signal and said test result signal are transmitted via a telephone network.

16. A method as claimed in claim 10, wherein said enable signal is transmitted by a computer and modem located at said remote location.

17. A method as claimed in claim 10 wherein said telephone is caused to response in said predetermined manner only when said plurality of sequential ringing signals occurs within a predetermined time interval.

18. A method as claimed in claim 13, wherein said test result signal is transmitted to said remote location.

19. A method as claimed in claim 13, wherein said test signal and said test result signal are transmitted via a telephone network.

20. A method as claimed in claim 11, wherein said enable signal is transmitted by a computer and modem located at said remote location.

21. A method as claimed in claim 11, wherein said telephone is caused to respond in said predetermined manner only when said plurality of sequential ringing signals occur within a predetermined time internal.

* * * * *